Oct. 12, 1948.  M. SWARTZMAN  2,451,181
DENTAL FLOSS HOLDER
Filed Sept. 11, 1945

Inventor
Morris Swartzman

Patented Oct. 12, 1948

2,451,181

UNITED STATES PATENT OFFICE 2,451,181

DENTAL FLOSS HOLDER

Morris Swartzman, Brooklyn, N. Y.

Application September 11, 1945, Serial No. 615,661

3 Claims. (Cl. 132—92)

The invention relates to improvements in dental floss holders, and among the objects of the invention are: to provide a dental floss holder that will be simple and easy and efficient to use; to provide a dental floss holder that can be easily manufactured and at low cost; to provide a dental floss holder with facilities for holding the dental floss firmly in place while the device is being used to remove food particles from the teeth; to provide a dental floss holder with facilities for holding a detachable supply spool; and to provide a dental floss holder with facilities for holding a dental floss supply disc of the conventional standard type now in commercial use.

Said invention is illustrated in the accompanying drawing.

Figure 1:
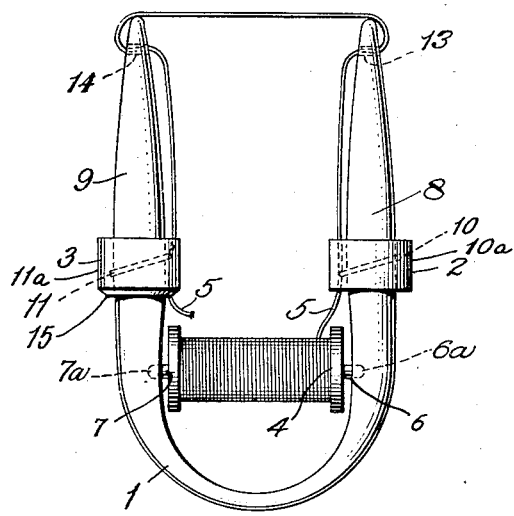
Figure 2:
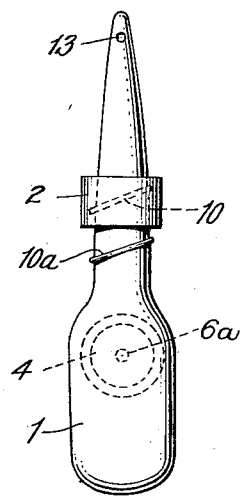
Figure 3:
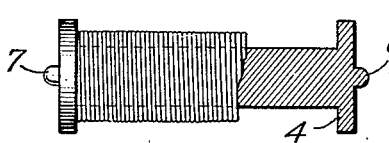
Figure 4:
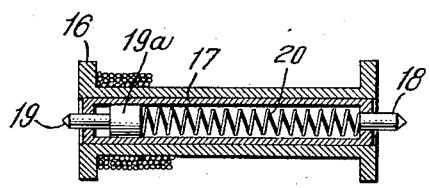

Figure 1 is a side elevation, and Figure 2 is an end elevation, illustrating one form of the invention. Figure 3 is a detail plan view, partly broken away, of the supply spool detached from the holding arms illustrated in Figures 1 and 2. Figure 4 is a fragmentary sectional view, through the supply spool, showing a modified construction of the supply spool.

Figure 5:
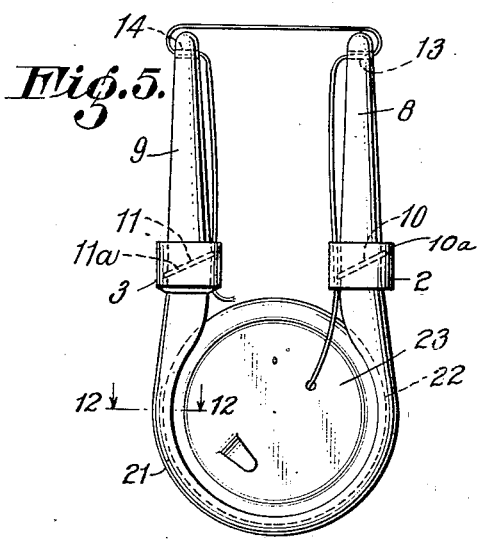
Figure 6:
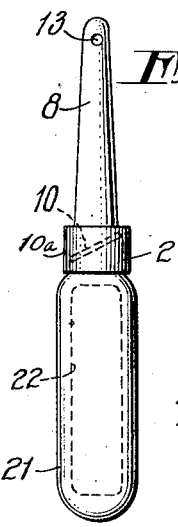
Figure 7:
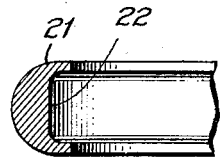

Figure 5 is a side elevation of a modified form of the invention. Figure 6 is an end elevation thereof. Figure 7 is a detail sectional view, taken on line 12—12 of Figure 5, looking in the direction of the arrows.

Arms 8 and 9 are continuations of yoke 1, said arms and yoke, as illustrated in the drawing, constituting one single part, piece, or unit.

Cylindrical supply spool 4, of the type elongated in the direction of the cylinder axis, and the ends of which are formed with integral trunnions 6 and 7, is, by forcing the two arms further apart, inserted into sockets 6a and 7a in the sides of yoke, said trunnions engaging said sockets.

Dental floss 5, from said supply spool, is inserted between arm 8 and ring 2 while said ring is in the raised position illustrated in Figure 2. Said ring is then lowered to position shown in Figure 1. Said ring has an internal spiral groove 10 which, as shown in Figure 1, engages tightly upon rounded spiral thread 10a which spiral thread is upon and an integral part of arm 8, thus holding tightly the dental floss which has been inserted between said arm and ring.

The end of the dental floss is then inserted into the horizontal tunnel or internal passage 13, running through arm 8, the floss being inserted through the opening at the inside of said arm, and emerging from the opening at the outside of said arm. The floss is then drawn across the gap between the two arms and enters horizontal tunnel or internal passage 14, running through arm 9, the floss being inserted through the opening at the outside of said arm, and emerging from the opening at the inside of said arm.

The floss is then inserted between arm 9 and ring 3 while said ring is in the position as illustrated in connection with ring 2 in Figure 2. Said ring is then lowered to position shown in Figure 1. Said ring has an internal spiral groove 11 which, as shown in Figure 1, engages tightly upon rounded spiral thread 11a which spiral thread is upon and an integral part of arm 9, thus holding tightly the dental floss which has been inserted between said arm and ring. The used part of the dental floss is drawn out from under ring 3, and said ring is then tightened in the manner above described. Said used part of the dental floss is then pressed against cutting edge 15, which is attached to bottom part of ring 3, thus cutting away the used part of the floss. Said cutting edge is bent inwardly, so that it will not touch gums or tissue when the device is placed inside the mouth.

Figure 4 illustrates a modified form of the supply spool, comprising a spool body 16 also of the long-cylinder type, but with the same provided with an axial tube 17, having a stationery trunnion 18 on the outer end thereof, which engages socket 6a. A sliding trunnion pin 19 extends from tube 17 and is provided with a spring follower 19a on its inner end, which is engaged by the expansion spring 20, enclosed by the tube 17. By pushing the spool body 16 to one side so as to compress the spring 20, the trunnion 18 may be released from socket 6a, and then the sliding trunnion 19 may be detached from the socket 7a.

Figures 5, 6, and 7 illustrate a modified form of the invention wherein the yoke 21 is provided with an internal groove 22, which receives the supply disc 23, which is of the conventional standard disc-spool type now in commercial use. This supply disc is inserted into said yoke and groove by forcing the arms 8 and 9 further apart.

All surfaces of every part and unit of the device are rounded so that they will not scratch or bruise the gums or tissue of the mouth.

Those sections of the arms located underneath the rings where rings are shown in Figures 1 and 2, which sections are herein referred to as "arm-middle," are round, and all of the arms above said sections are round. The yoke, and also the sections of the arms below arm-middle are flat with rounded edges, excepting that sections of the arms immediately below arm-middle are tapered in order to effect graduated change from the round to the flat construction. When the device is not being used, the rings must always be tightened against the arms, in order that the rings may not fall off the arms.

If desired, sections of arms above arm-middle can be constructed so that such sections will be flat and wider (as viewed in end elevation of the device) than the diameter of arm-middle at the widest part of arm-middle, thus making it impossible for rings to fall off the arms even when rings are not tightened against the arms.

If desired, passages 13 and 14 can be constructed so that they will run vertically, or so that they will run obliquely, inside the arms, instead of horizonally as shown in the drawing.

The improvements embodied in this invention can be utilized in constructions other than those described and shown in this specification and in the accompanying drawing, and I therefore do not wish to restrict this invention to the specific forms and constructions described and shown in this specification and in the accompanying drawing.

Having described my invention, I claim as new:

1. In a dental floss holder of the kind including a yoke integrally carrying a pair of opposing arms across the upper limits of which a length of dental floss is to be drawn taut, the combination of means including mutually facing formations on the holder near the lower ends of the arms for detachably mounting on the holder a spool of dental floss by engagement of opposite portions of such spool with said formations, and means for holding a length of floss in taut condition spanningly of the arms near their upper ends while said length is unsevered from a length of floss running along the exterior of said arms and over the major length of one of said arms and exteriorly of the latter, the last-named length of floss coming from said spool, said holding means comprising a thread on each arm, a ring on each arm having a thread engageable with the thread on its arm, each ring being axially movable along its arm after disengagement of its thread thereby to permit insertion through the ring of a length of floss, whereby on again engaging the threads of an arm and its ring and thereupon turning said ring on its arm the floss will be pinched by and anchored between said arm and its ring.

2. In a dental floss holder of the kind including a yoke integrally carrying a pair of opposing arms across the upper limits of which a length of dental floss is to be drawn taut, the combination of means including mutually facing formations on the holder near the lower ends of the arms for detachably mounting on the holder a spool of dental floss by engagement of opposite portions of such spool with said formations, and means for holding a length of floss in taut condition spanningly of the arms near their upper ends while said length is unsevered from a length of floss running along the exterior of said arms and over the major length of one of said arms and exteriorly of the latter, the last-named length of floss coming from said spool, said holding means comprising a thread on each arm, a ring on each arm having a thread engageable with the thread on its arm, each ring being axially movable along its arm after disengagement of its thread thereby to permit insertion through the ring of a length of floss, whereby on again engaging the threads of an arm and its ring and thereupon turning said ring on its arm the floss will be pinched by and anchored between said leg and its ring, one of said rings having a cutting edge at its end closer to said yoke for acting as a knife for cutting off used floss.

3. In a dental floss holder of the kind including a yoke integrally carrying a pair of opposing arms across the upper limits of which a length of dental floss is to be drawn taut, the combination of means including mutually facing formations on the holder near the lower ends of the arms for detachably mounting on the holder a spool of dental floss by engagement of opposite portions of such spool with said formations, and means for holding a length of floss in taut condition spanningly of the arms near their upper ends while said length is unsevered from a length of floss running along the exterior of said arms and over the major length of one of said arms and exteriorly of the latter, the last-named length of floss coming from said spool, said holding means comprising a thread on each arm, a ring on each arm having a thread engageable with the thread on its arm, each ring being axially movable along its arm after disengagement of its thread thereby to permit insertion through the ring of a length of floss, whereby on again engaging the threads of an arm and its ring and thereupon turning said ring on its arm the floss will be pinched by and anchored between said leg and its ring, one of said rings having a cutting edge at its end closer to said yoke for acting as a knife for cutting off used floss, said cutting edge being formed completely about said ring permitting cutting of said floss irrespective of the turned position of said ring.

MORRIS SWARTZMAN.

REFERENCES CITED

The following references are of record in the file of this patent:

UNITED STATES PATENTS

| Number | Name | Date |
| --- | --- | --- |
| 618,009 | La Varre | Jan. 17, 1889 |
| 1,184,052 | Turner et al. | May 23, 1916 |
| 1,368,555 | Henerlau | Feb. 15, 1921 |
| 1,588,307 | Cammack | June 8, 1926 |
| 1,627,525 | Munro | May 3, 1927 |
| 2,067,889 | Collingbourne | Jan. 19, 1937 |